United States Patent

Bright

(10) Patent No.: US 10,544,872 B2
(45) Date of Patent: Jan. 28, 2020

(54) LIQUID CAPTURE VALVE

(71) Applicant: IBALL INSTRUMENTS LLC, Norman, OK (US)

(72) Inventor: Carl Bright, McLoud, OK (US)

(73) Assignee: IBALL INSTRUMENTS LLC, Norman, OK (US)

( * ) Notice: Subject to any disclaimer, the term of this patent is extended or adjusted under 35 U.S.C. 154(b) by 163 days.

(21) Appl. No.: 15/670,058

(22) Filed: Aug. 7, 2017

(65) Prior Publication Data
US 2019/0040967 A1    Feb. 7, 2019

(51) Int. Cl.
| F16K 21/18 | (2006.01) |
| F16K 1/14 | (2006.01) |
| F16K 17/02 | (2006.01) |
| E21B 21/06 | (2006.01) |
| E21B 49/08 | (2006.01) |
| E21B 21/10 | (2006.01) |
| F16K 31/18 | (2006.01) |

(52) U.S. Cl.
CPC ............ *F16K 21/18* (2013.01); *E21B 21/067* (2013.01); *E21B 21/106* (2013.01); *E21B 49/086* (2013.01); *F16K 1/14* (2013.01); *F16K 17/02* (2013.01); *F16K 31/18* (2013.01)

(58) Field of Classification Search
CPC .... E21B 21/106; E21B 21/067; E21B 49/086; F16K 21/18; F16K 1/14; F16K 17/02; F16K 15/04; F16K 31/18
USPC ........................................ 137/398, 409, 539
See application file for complete search history.

(56) References Cited

U.S. PATENT DOCUMENTS

| 186,533 | A | * | 1/1877 | Boldemann | F02M 1/00 137/409 |
| 475,533 | A | * | 5/1892 | Beaumont | E03D 1/165 137/135 |
| 777,654 | A | * | 12/1904 | Hoon et al. | F16K 15/044 137/539 |
| RE14,937 | E | * | 8/1920 | Pruitt | F04F 1/18 417/85 |
| 2,544,651 | A | * | 3/1951 | Boardman | B65D 90/34 137/1 |
| 2,869,673 | A | * | 1/1959 | Erwin | B01D 19/0036 96/159 |
| 2,923,151 | A | * | 2/1960 | Engle | E21B 49/005 175/206 |
| 3,241,295 | A | * | 3/1966 | Griffin, III | E21B 21/067 55/468 |
| 3,325,974 | A | * | 6/1967 | Griffin, III | E21B 21/067 96/162 |

(Continued)

FOREIGN PATENT DOCUMENTS

EP        3058997 A1 *  8/2016  ......... B01D 19/0036

OTHER PUBLICATIONS

Wikipedia, "Muskeg", https://en.wikipedia.org/wiki/Muskeg, 3 pages (Year: 2019).*

*Primary Examiner* — Jennifer H Gay
(74) *Attorney, Agent, or Firm* — Hall Estill Attorneys at Law; Tyler J. Mantooth

(57) ABSTRACT

A liquid capture valve may have a housing that physically contacts a lid and contains a floating member. The lid can have an inlet and an outlet with the outlet positioned at an apex of a sealing surface. The floating member can be configured to seal the outlet by contacting an outlet edge in response to the housing containing a predetermined volume of liquid.

20 Claims, 3 Drawing Sheets

(56) References Cited

U.S. PATENT DOCUMENTS

| | | | | |
|---|---|---|---|---|
| 3,358,425 | A * | 12/1967 | Burnham, Sr. | B01D 19/0042 |
| | | | | 159/3 |
| 3,359,708 | A * | 12/1967 | Barber | B01D 19/0057 |
| | | | | 96/167 |
| 3,495,438 | A * | 2/1970 | Mangum | E21B 49/005 |
| | | | | 73/152.03 |
| 3,563,053 | A | 2/1971 | Bottum | |
| 3,616,599 | A * | 11/1971 | Burnham | B01D 19/0021 |
| | | | | 137/533.11 |
| 4,108,619 | A * | 8/1978 | Phillips | B01D 19/0047 |
| | | | | 96/196 |
| 4,381,191 | A * | 4/1983 | Brand | E21B 21/067 |
| | | | | 96/198 |
| 4,635,735 | A * | 1/1987 | Crownover | E21B 21/067 |
| | | | | 175/42 |
| 4,847,943 | A * | 7/1989 | Blase | A47L 7/0009 |
| | | | | 15/352 |
| 4,887,464 | A * | 12/1989 | Tannenbaum | E21B 21/08 |
| | | | | 73/152.04 |
| 5,141,405 | A | 8/1992 | Francart, Jr. | |
| 5,184,939 | A * | 2/1993 | Solomon | F04B 49/04 |
| | | | | 184/1.5 |
| 5,242,475 | A | 9/1993 | Stine et al. | |
| 5,265,653 | A | 11/1993 | Herlth | |
| 5,366,349 | A | 11/1994 | Ilg | |
| 5,938,409 | A | 8/1999 | Radle, Jr. et al. | |
| 6,244,828 | B1 | 6/2001 | Yumoto | |
| 6,944,890 | B1 | 9/2005 | Sim | |
| 7,392,138 | B2 * | 6/2008 | Frechin | G01N 33/2823 |
| | | | | 422/68.1 |
| 8,057,192 | B2 | 11/2011 | Page, Jr. et al. | |
| 8,337,580 | B2 * | 12/2012 | Manska | A47L 7/0071 |
| | | | | 55/337 |
| 8,536,524 | B2 * | 9/2013 | Pomerantz | H01J 49/26 |
| | | | | 250/281 |
| 2001/0032669 | A1 * | 10/2001 | Stumphauzer | F16T 1/24 |
| | | | | 137/195 |
| 2004/0089157 | A1 * | 5/2004 | von Stackelberg, Jr. | |
| | | | | A47L 5/365 |
| | | | | 96/406 |
| 2011/0094736 | A1 * | 4/2011 | Evrard | E21B 21/067 |
| | | | | 166/267 |
| 2012/0000278 | A1 * | 1/2012 | Phillips | B01D 19/0052 |
| | | | | 73/152.04 |
| 2012/0055125 | A1 * | 3/2012 | Manska | A47L 7/0071 |
| | | | | 55/394 |
| 2013/0270006 | A1 * | 10/2013 | Selman | E21B 49/005 |
| | | | | 175/24 |
| 2016/0273355 | A1 * | 9/2016 | Gosney | B01D 19/0078 |
| 2017/0268333 | A1 * | 9/2017 | Pickell | E21B 49/005 |
| 2018/0155903 | A1 * | 6/2018 | Volk | C02F 1/325 |
| 2018/0320463 | A1 * | 11/2018 | Bertrand | E21B 49/005 |
| 2019/0040713 | A1 * | 2/2019 | Bright | E21B 34/00 |
| 2019/0040967 | A1 * | 2/2019 | Bright | F16K 21/18 |

* cited by examiner

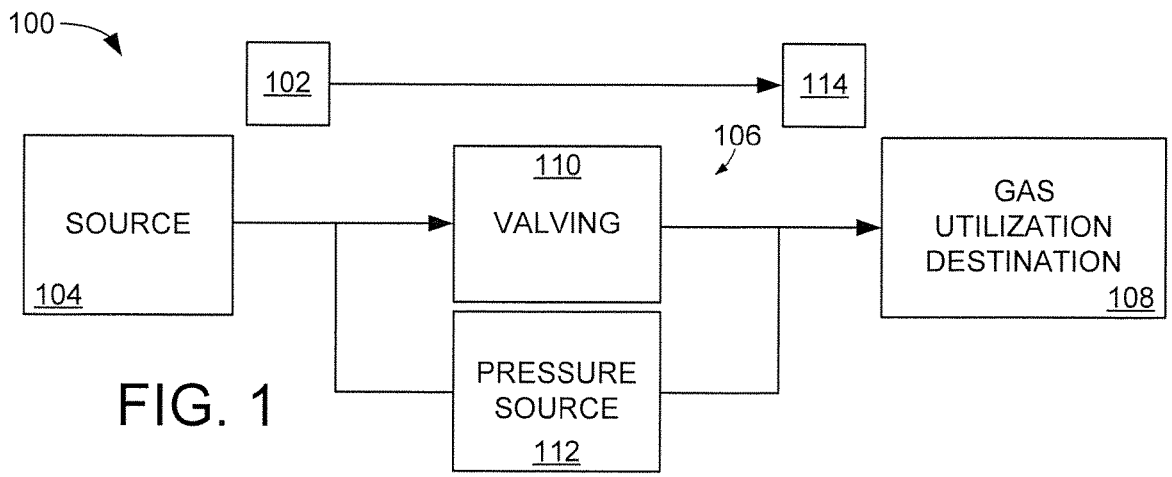
FIG. 1
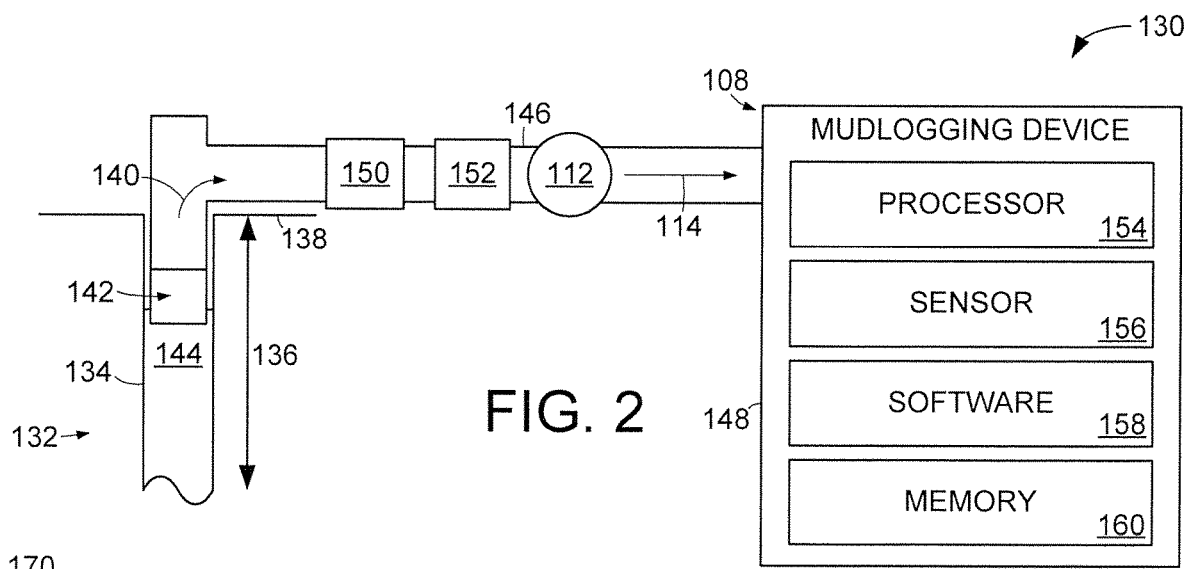
FIG. 2
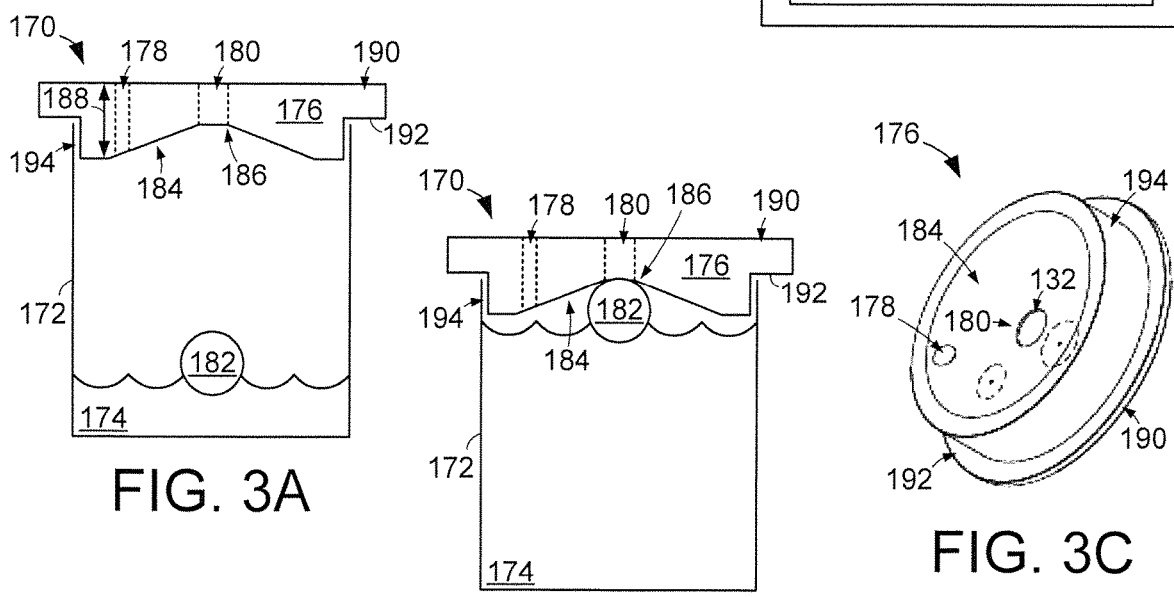
FIG. 3A
FIG. 3B
FIG. 3C

LIQUID CAPTURE VALVE

SUMMARY

A liquid capture valve, in accordance with various embodiments, has a housing that physically contacts a lid and contains a floating member. The lid has an inlet and an outlet with the outlet positioned at an apex of a sealing surface. The floating member moves to seal the outlet by contacting an outlet edge in response to the housing containing a predetermined volume of liquid.

BRIEF DESCRIPTION OF THE DRAWINGS

FIG. 1 represents an example sample system arranged in accordance with various embodiments.

FIG. 2 displays an example testing system configured and operated in accordance with some embodiments.

FIGS. 3A-3D respectively show line representations of an example liquid capture valve that may be employed in the systems of FIGS. 1 & 2.

DETAILED DESCRIPTION

Figure 3D:
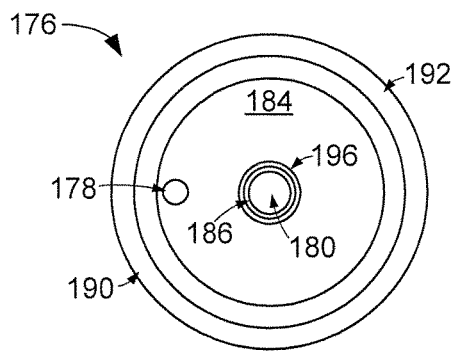

Various embodiments are generally directed to apparatus, systems, and methods of using a liquid capture valve to transform a fluid sample comprising liquid and gas into a gas-only sample.

Measurement of gases constituent in a gas sample can provide valuable insight into the source of the gas sample. In some environments, a gas sample is rendered originally from a fluid sample that may, or may not, contain an unknown amount of liquid and/or liquid vapor. Although the separation of gases and liquids from a fluid sample can be straightforward, conventional separation means can be unreliable in the presence of relatively large volumes of collected liquid. As a result, a gas sample may contain an appreciable amount of liquid or liquid vapors that can degrade, slow, and/or damage a downstream gas utilization destination.

In some non-limiting environments, fluid samples can also contain harsh chemicals under high pressure and temperature that can be difficult to efficiently separate. The reliability of liquid-to-gas separators can further be stressed by relatively harsh operating environments that can span a variety of weather conditions including wet, dry, hot, cold, humid, windy, and icy. Such fluid and weather conditions can accumulate liquid quickly both from the fluid source and from condensation during transport through a sample collection method. It is noted that liquid separators have a finite collection volume before service is required to empty and clear the assembly and while a separator is full, liquids have a greater chance of bypassing the separator to downstream devices. Hence, there is a need for a more reliable liquid separating assembly that fails closed when full so that no liquid reaches downstream gas-specific and gas-only destinations.

While some embodiments will be directed to the collection, transport, and measurement of fluids associated with hydrocarbon exploration, extraction, and transmission, which can be characterized generally as mudlogging, the disclosure is not so limited. For instance, a liquid capture valve may be used in the transportation, processing, and measurement of any type of fluid combination of gas and liquid, gas alone, or liquid alone.

Throughout the history of the mudlogging industry, a focus is the collection of sample gasses out of the drilling fluid utilized in the drilling of natural resources and the subsequent quantitation and analyzation of the drilling fluid to ascertain information about the fluid as well as the underground source of the fluid. Such ascertained fluid information allows people in charge of drilling operations to make critical decisions during the drilling process, such as where to drill and where to stop drilling.

A sample gas can be extracted from drilling fluid using a mechanical agitation means, for example, that is entrapped within some kind of enclosure and then drawn from an extraction apparatus to analyzing equipment using a vacuum principal of some sort. During the mechanical sample gas extraction, water and other liquids may become atomized and drawn into the vacuum collection system with the sample gasses. This vaporous water and other liquids can condensate within the sample transport line during the travel from the extraction method to the analyzation equipment.

While liquid extraction means, such as a filter or separator, can capture some liquids before the liquids reach the sensitive analyzation equipment, issues occur when the liquid separation means fail or are full of collected liquid, which results in degraded performance that allows liquids to reach destinations reserved solely for gas. For instance, a drop out jar may fill to capacity thereby allowing a full flow of liquid into the sample gas analyzer. Generally, if condensate liquids are drawn through the sample gas analyzer, the sample gas analyzer will be damaged and be in need of repair. Thus, various embodiments are specifically beneficial to hydrocarbon exploration, collection, and transportation industries where gas measurements are often undertaken and relied upon for valuable decision-making.

Accordingly, various embodiments of this disclosure provide a liquid capture valve that allows the reliable capture of liquids regardless of the quantity of liquid upstream of or within the valve. The configuration of the lid of the liquid capture valve allows a floating member to reliably float on the collected liquid and seal the outlet when the valve is full. The lid design further provides greater seal pressure on the floating member over time to ensure any liquid contained in the capture valve is not sent downstream.

FIG. 1 is a block representation of an example sample system 100 in which various embodiments may be practiced. A fluid sample 102 can originate at one or more sources 104 that may be dissimilar physical locations and/or types of fluid. For example, the source 104 can be a combination of a first source that is a naturally occurring reservoir of a fluid combination of different liquids and gases while a second source is a stream of man-made gas. Hence, it is contemplated that a sample system 100 can concurrently or sequentially collect fluid samples containing a diverse variety of constituent liquids and/or gases from one or more sources 104.

Regardless of where and what type of fluid sample 102 is provided by a source 104, a transmission assembly 106 can transport the sample 102 to one or more gas utilization destinations 108. While not limiting, the transmission assembly 106 can have various valves 110 and at least one pressure means 112 to direct the fluid sample 102 towards the gas utilization destinations 108. The gas utilization destinations 108 may be gas-specific devices, such as measurement equipment, that are sensitive to the presence of liquids in the fluid sample 102. Thus, the transmission assembly 106 can consist of one or more devices that process the fluid sample 102 into a gas sample 114 that has negligible liquid or liquid vapor.

FIG. 2 represents an example mudlogging testing system 130 that is arranged in accordance with some embodiments. The testing system 130 has a downhole fluid sample source 132 that is connected to a gas utilization destination 108 via a transmission assembly 106. The downhole sample source 132 can be a wellbore 134 having a depth 136 below ground-level 138, such as 100 feet or more. The wellbore 134 may be an open bore or a cased production string designed to extract underground hydrocarbons in various forms, such as liquid oil and natural gas.

At any depth 136 in the wellbore 134, a fluid sample 140 can be collected via a sample extractor 142. The sample extractor 142 may be placed anywhere drilling fluid 144 is present, such as above ground-level 138, to extract a sample 140 from the drilling fluid 144. The fluid sample 140 may contain any combination of liquids and gases that are carried through the transmission assembly 106 via a pressure source 112, which may be a pump, compressor, or combination of the two to provide positive or vacuum pressure on the fluid sample 140.

The transmission of the fluid sample 140 towards the gas utilization destination 108 via the pressure source 112 flows through at least one conduit 146, which may be rigid or flexible tubing and/or piping. The conduit 146 may continuously extend for a length, such as 100 feet or more, that exposes the fluid sample 140 to environmental conditions outside the conduit 146 that can condense vaporized liquid in the fluid sample 140. As the fluid sample 140 collects condensed liquids, the pressure/vacuum from the pressure source 112 will send the liquid towards the gas utilization destination 108, which is problematic for destinations like the example mudlogging device 148 shown in FIG. 2 that are designed to receive gas samples exclusively.

It is contemplated that the transmission assembly 106 can comprise one or more sample processing means 150, such as a moisture trap, filter, separator, and valves. However, conventional liquid trapping and/or separating means have proven unreliable over time, particularly in harsh conditions commonly associated with hydrocarbon exploration and processing. Accordingly, various embodiments position at least one liquid capture valve 152 in-line with the conduit 146 between the wellbore 134 and the mudlogging device 148 to provide a failsafe that prevents liquid from arriving at the mudlogging device 148 regardless of the amount of liquid previously collected by the capture valve 152.

It is noted that the mudlogging device 148 can be positioned anywhere relative to the wellbore 134, but in some embodiments, is on-site with the wellbore 134, such as within 1000 feet, and contained within a single explosion-proof housing with computing equipment that allows for the input of a gas sample 114 and the output of at least one gas measurement, such as the presence of one or more constituent gases, while on-site. As a non-limiting example, the mudlogging device 148 can have at least one local processor 154, such as a microprocessor or programmable controller, that directs gas measurements activity with at least one sensor 156 as directed by software 158 stored in local memory 160. The results of the gas sample measurements can be locally stored or sent to a remote host via a communication circuit 162, such as a wireless or wired radio, telephone, secure, or non-secure broadcast means.

Line representations of portions of an example liquid capture valve 170 are illustrated in FIGS. 3A-3D. The liquid capture valve 170 may be employed in the systems 100 and 130 in accordance with various embodiments to collect liquid present in a fluid sample 102 in order to transform the fluid sample into a gas sample 114 that is proper for analysis by at least one downstream gas utilization destination 108. The liquid capture valve 170 can have a housing 172 that has an interior volume capable of retaining any number and type of liquid 174.

The housing 172 may, in some embodiments, be open to ambient air or vented to allow vapors to escape while other embodiments seal the housing 172 with a lid 176 that has at least one inlet 178 and at least one outlet 180. One or more floating members 182 can be positioned within the housing 172 and configured with a size, weight, and texture that mates with a sealing surface 184 of the lid 176 to seal at least the outlet 180. The sealing surface 184, as shown, can be a continuously tapered sidewall that circumferentially surrounds the outlet 180 to direct movement of the floating member 182 towards, and in to contact with, an outlet edge 186.

As a non-limiting example, flow of a fluid sample into the inlet 178 results in condensed liquid 174 dropping to the bottom of the housing 172 while the gaseous component of the fluid sample flows uninterrupted from the inlet 178 to the outlet 180, as promoted by one or more pressures to the respective inlet 178 and outlet 180. When the collected condensed fluid lifts the floating member 182 to the top of the housing 172 and in contact the outlet edge 186, the outlet 180, and any vacuum pressure supplied to the outlet 180 is effectively blocked. If the condensed fluids 174 continue to rise in the housing 172, then the floating member 182 will continue to block the outlet 180 with more energy and a stronger seal, which ensures no liquid or liquid vapor passes through the outlet 180 despite the housing 172 being full of liquid 174.

FIG. 3B displays how the contact of the floating member 182 and outlet edge 186 effectively seals the outlet 180 and prevents any flow of gases, or liquids, downstream. It is noted that the inlet 178 has a different length 188 and a different diameter than the outlet 180, which can be tuned to promote the condensation of liquid vapor. As the liquids 174 fill the housing 172, the floating member 182 is guided to the center of the lid 176 by the sealing surface 184 whereby contacting and sealing the outlet edge 186. Hence, the floating member 182 can be forced into contact with the outlet edge 186 by vacuum pressure from the outlet 180, positive pressure from the inlet 178, and/or force from the underlying liquid 174.

The central position of the outlet 180 in the lid 176 at the apex of the conical sealing surface 184, as shown in FIGS. 3C & 3D, allows the inlet 178, in some embodiments, to remain open and pressurize the housing 172, which forces the floating member 182 into more secure contact with the outlet edge 186 to provide a stronger seal than if the inlet 178 was sealed and a vacuum was created in the housing 172. The perspective view of the housing side of the lid 176 displays how a retention protrusion 190 can continuously extend around the lid 176 to provide a retention surface 192 that rests on the periphery of the housing 172.

The retention protrusion 190 and retention surface 192 may be complemented by a vertical sidewall 194 that is positioned proximal the interior sidewalls of the housing 172. It is contemplated that the vertical sidewall 194 contacts, or is separated from, the interior sidewalls of the housing 172 to provide more, or less, friction retention of the lid 176 to the housing 172. FIG. 3D is a bottom plan view of the lid 176 that shows how a sealing member 196, such as a gasket or o-ring, is positioned proximal the outlet edge 186 to promote contact, and creation of a secure seal, between the floating member 182 and the outlet edge 186. As such, the sealing member 196 can be separated from, or be incorporated into, the outlet edge 186 to promote efficient creation and retention of an outlet seal with the floating member 182.

In the non-limiting embodiment where the sealing member 196 is an o-ring, after the round floating member 182 comes in contact with the sealing member 196 in the center of the lid 176, any vacuum to the housing through the outlet 180 is stopped by the interference between the floating member 182 and the outlet edge 186, as supported by the sealing member 196. Any additional vacuum to the outlet 180 will pull the floating member 182 tighter to the sealing member 196 and outlet edge 186, which makes for a better and stronger seal. If more liquid is introduced into the housing 172 from the inlet 178, the floating member 182 will exert more force on the outlet edge 186 from the bottom making for a better and stronger seal. It is contemplated that the lid 176 may consist of multiple separate sealing members 196 that may, or may not, be dissimilar materials to more efficiently create and retain a seal compared to a single sealing member 196.

Figure 4:
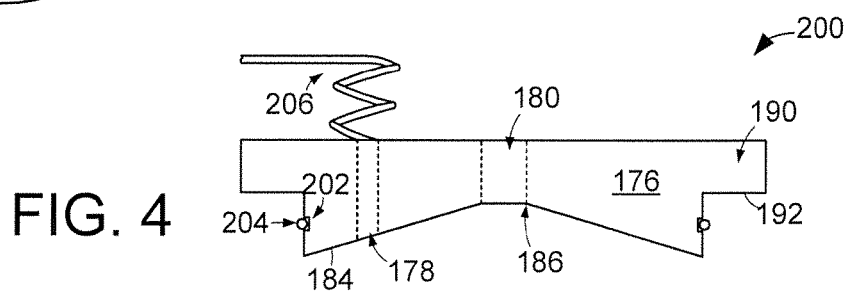
FIG. 4 illustrates a cross-sectional line representation of an example liquid capture valve that can be utilized in the systems of FIGS. 1 & 2.

FIG. 4 depicts a cross-sectional line representation of an example lid 200 that can be configured with any shape and size to fit onto a housing 172, as conveyed in FIGS. 3A & 3B. The lid 200 has a notch 202 in the vertical sidewall 194 that retains a secondary sealing member 204, such as a gasket and/or o-ring, to create a seal between the lid 200 and housing 172. It is contemplated that the lid 200 can consist of multiple secondary sealing members 204 that can be positioned in separate notches 202 to promote lid seal and physical retention regardless of environmental, pressure, and liquid conditions.

The lid 200 may, in some embodiments, have a condensing member 206 that is configured to promote the condensing of liquid vapor into liquid at the inlet 178. The condensing member 206 can be any tubing, piping, or assembly that increases the possibility of liquids in a fluid sample to condense into liquid that can be captured in the housing 172 attached to the lid 200. Assorted embodiments arrange the condensing member 206 as a coil, as shown in FIG. 4, which increases the surface area exposure of the fluid sample 102 to the ambient environment, much akin to a still.

With the ability to seal the lid 200 and promote condensation of liquid vapor into liquid upstream of the inlet 178, the lid 200 can provide optimized transformation of a fluid sample 102 into a gas sample 114. However, the efficient collection of liquid from a fluid sample can quickly fill a capture valve. While the configuration of the lid, floating member, and housing can prevent liquid from flowing downstream once the housing is full of liquid, no flow through a capture valve can degrade overall system performance by requiring servicing to empty the housing. Hence, various embodiments are directed to arrangements that allow the housing to automatically dispel liquid when full.

Figure 5:
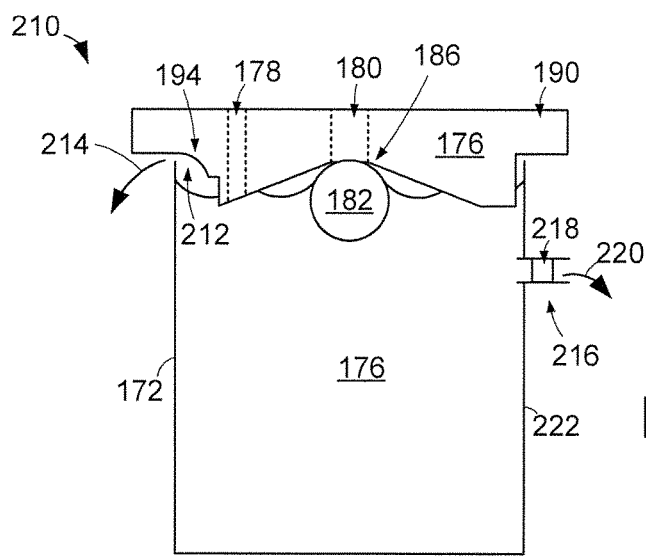
FIG. 5 provides a line representation of an example liquid capture valve configured and operated in accordance with assorted embodiments.

FIG. 5 displays a side view line representation of an example liquid capture valve 210 that can be employed by the systems 100 and 130 in accordance with various embodiments. It is noted that a continually open port to evacuate liquids from the housing 172 would degrade the pressure at the inlet 178 and outlet 180 along with the flow of a fluid sample 102 in and a gas sample 114 out of the valve 210. Accordingly, liquid evacuation means from the housing 172 must be capable of retaining pressure in the housing 172 to allow efficient flow of the fluid 102 and gas 114 samples.

A non-limiting embodiment configures the lid 176 with a liquid port 212, which is exaggerated in FIG. 5, that allows liquid 214 to spill out of the housing 172 once a certain pressure is contained in the housing 172. That is, the retention surface 194 of the lid 172 can be configured to retain a predetermined pressure in the housing 172 to allow nominal flow from inlet 178 to outlet 180 and allow liquid to flow 214 from the housing 172 in response to an elevated pressure in the housing 172 that results from the floating member 182 sealing the outlet 180 and the inlet continuing to supply positive pressure. Thus, until the floating member 182 seals the outlet 180, the vertical sidewall liquid port 212 configuration maintains housing 172 pressure and then allows liquid port 214 to pass under heightened pressure associated with a full housing 172 and positive pressure supplied via the inlet 178.

Although the liquid port 212 can allow liquid 174 to pass under high housing pressure when the housing 172 is full, such arrangement may not be ideal for some operating conditions. Therefore, the housing 172 can be configured with one or more squirt ports 216 that are filled with a mechanical actuation means 218 that responds to the presence of liquid 174 by temporarily opening to allow the liquid 220 to escape the housing 172. For example, the squirt port 216 may be connected to a float switch in the housing 172 or a different sensor, such as optical or proximity detectors, that electrically trigger a solenoid in the port 216 to open to allow liquid 220 to spill out as motivated by the pressure of the housing 172 and other liquid 174.

While the squirt port 216 is shown at a relatively high position on the housing 172 sidewall, such position is not required or limiting as the port 216 can be positioned anywhere on the housing 172. For instance, the port 216 can be positioned at a midpoint of the housing sidewall 222.

In some embodiments, the actuating means 218 of the squirt port 216 opens for a designated amount of time, such as less than a second, so that pressure in the housing 172 is maintained or minimally reduced, such as by less than 1 psi. Such short port 216 opening times can be conducted cyclically according to a predetermined schedule, such as once every minute, or in response to detected housing pressure, such as opening until housing pressure drops by more than a set amount. As a result, the squirt port 216 can intelligently evacuate liquid 174 from the housing 172 without requiring service from a user or interruption of gas sample flow downstream from the valve 210.

The ability to tune the size, position, and liquid evacuation means in the capture valve 210 allows a diverse variety of fluid sample and pressurization conditions to be accurately accommodated. For instance, multiple different, or similar, liquid evacuation means (FIG. 5 can be incorporated into a lid that has a condensing member (FIG. 4) to change the rate of liquid collection and sensitivity of the valve to liquid present in a fluid sample. Regardless of the configuration, a capture valve can process a fluid sample 102 into a gas sample 114 while ensuring liquid does not flow downstream to any gas utilization destinations.

However, a transmission assembly 106 may have additional sample processing means that can act in concert with one or more liquid capture valves to efficiently provide a gas sample to a downstream gas utilization destination. FIG. 5 illustrates a block representation of an example transmission assembly 230 that can be used to transport and process fluid samples 102 into a gas sample 114 ready for use in one or more gas utilization destinations. As shown, a fluid sample 102 from at least one source 104 can encounter a check valve 232, first capture valve 234, filter 236, moisture trap 238, condenser 240, and second capture valve 242 in route to a gas utilization destination 108.

Although FIG. 5 conveys the respective aspects of the transmission assembly 230 in a sequence, such arrangement is not required or limiting as any number and type of device can be placed in-line between a source 104 and the destination 108. As a result of flow through the transmission assembly 230, the fluid sample 102 that has an unknown composition upstream results in a gas sample 114 with a solely gaseous composition downstream.

Figure 6:
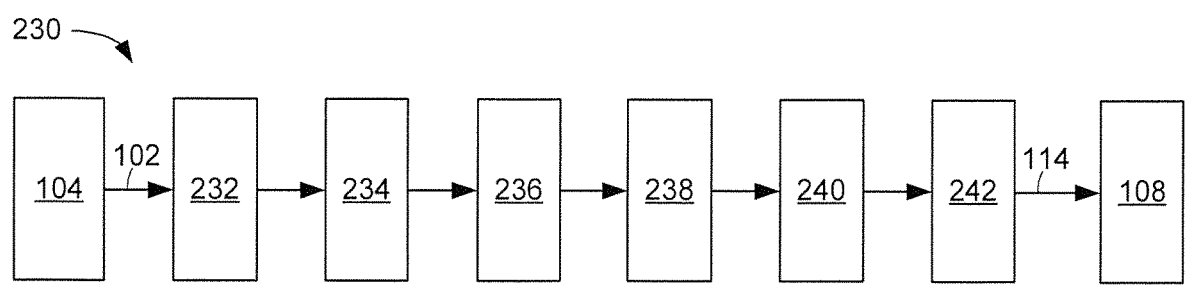
FIG. 6 depicts a block representation of an example transmission assembly capable of being used by the systems of FIGS. 1 & 2.
Figure 7:
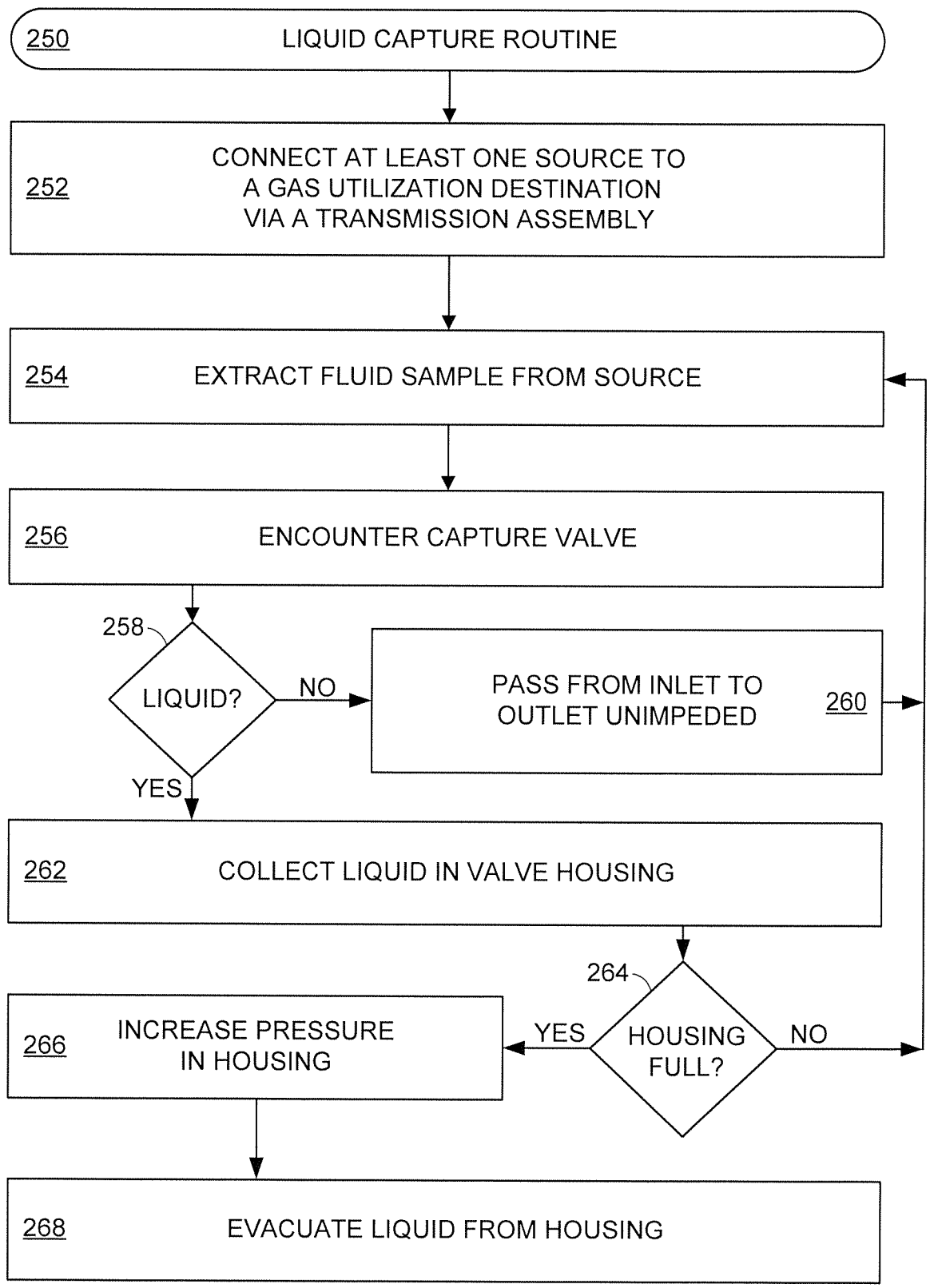
FIG. 7 is a flowchart of an example sample liquid capture routine carried out by the systems of FIGS. 1 & 2 in accordance with various embodiments.

FIG. 6 is a flowchart of an example sample liquid capture routine 250 that can be conducted with the various embodiments of FIGS. 1-5. Initially, the routine 250 connects at least one source, such as a downhole wellbore, to at least one gas utilization destination, such as a mudlogging device, in step 252 via a transmission assembly. The transmission assembly consists of at least one liquid capture valve and may comprise other devices, as conveyed in FIG. 5.

Step 254 extracts a fluid sample from a source and delivers the sample to the transmission assembly where it encounters a capture valve in step 256. At the inlet of the capture valve, decision 258 is determinative on the presence of liquid and/or liquid vapor in the fluid sample. If no liquids are present, step 260 allows the fluid sample to pass from the inlet to the outlet automatically and unimpeded as a gas sample that travels downstream. At the conclusion of the gas sample passing through the capture valve, routine 250 returns to step 254 where another fluid sample is collected from a source.

In the event liquid is present in the fluid sample, decision 258 prompts step 262 to collect the liquid in the valve housing, which effectively separates the liquid from the fluid sample to transform the sample into a gas sample. It is noted that step 262 may further involve passing the fluid sample through a condenser that is external to the valve housing, such as condensing member 206 of FIG. 4. The valve housing may collect liquid continuously, or sporadically, for any amount of time with decision 264 determining if the housing is full of liquid. A housing that is not full of liquid after a fluid sample has passed the capture valve as a gas sample returns routine 250 to step 254 where a new fluid sample is extracted.

A housing full of liquid, or with a volume of liquid beyond a predetermined threshold volume, triggers step 266 where the pressure inside the valve housing increases as the floating member of the capture valve engages and seals the outlet edge. As positive pressure continues to flow into the housing via the open inlet, the pressure of the housing increases and the floating member is continuously pushed onto the outlet edge. It is noted that any vacuum pressure on the outlet further secures the floating member in sealing engagement with the outlet edge.

The sealing of the valve outlet causes step 268 to subsequently evacuate some, or all, of the liquid from the valve housing. Step 268 can involve an external user physically removing the lid from the housing of the capture valve to empty the housing or the automatic opening of one or more evacuation ports activated by the increased housing pressure, as generally described in FIG. 5.

Through the various embodiments of the present disclosure, liquids are reliably separated over time and prevented from reaching a gas-specific destination. Configuring a liquid capture valve with a floating member inside a housing with a lid having a conical sealing surface efficiently directs the floating member to seal the valve outlet and keep liquid from passing downstream even if the housing is full of liquid. The ability to add automatic liquid evacuation ports to the valve housing allows internal housing pressure to force liquid out of the capture valve, which can result in the valve subsequently allowing for normal valve operation after being full without disassembling the valve.

What is claimed is:

1. An apparatus comprising a housing physically contacting a lid and containing a floating member, the lid having an inlet and an outlet, the inlet having a greater length and smaller diameter than the outlet, the outlet positioned at an apex of a sealing surface of the lid, the floating member configured to seal the outlet by contacting an outlet edge in response to the housing containing a predetermined volume of liquid.

2. The apparatus of claim 1, wherein the sealing surface is a single conical sidewall of the lid.

3. The apparatus of claim 1, wherein a sealing member is positioned proximal the outlet.

4. The apparatus of claim 3, wherein the sealing member is an o-ring.

5. The apparatus of claim 1, wherein the lid has a protrusion providing a vertical sidewall that contacts a sidewall of the housing.

6. The apparatus of claim 1, wherein a vertical sidewall of the lid has a notch where a sealing member is disposed between the housing and the lid to seal the housing.

7. The apparatus of claim 1, wherein the floating member is a sphere having a diameter bigger than a diameter of the outlet.

8. The apparatus of claim 1, wherein the liquid is water.

9. The apparatus of claim 1, wherein the outlet is positioned in a center of the lid and center of the housing, the inlet outlet is positioned offset from the center of the lid and center of the housing.

10. A system comprising a housing connected in-line between a wellbore and a mudlogging device as part of a transmission assembly, the housing physically contacting a lid and containing a floating member, the lid having an inlet and an outlet, the inlet having a greater length and smaller diameter than the outlet, the outlet positioned at an apex of a conical sealing surface of the lid, the floating member configured to seal the outlet by contacting an outlet edge in response to the housing containing a predetermined volume of liquid.

11. The system of claim 10, wherein the first housing is positioned within 1000 feet of the wellbore.

12. The system of claim 10, wherein the inlet is attached to a condensing member positioned outside the housing.

13. The system of claim 10, wherein the inlet s connected in-line to a check valve as part of the transmission assembly.

14. The system of claim 10, wherein the transmission assembly comprises a moisture trap upstream of the housing.

15. A method comprising:
connecting a capture valve between a fluid source and a gas utilization destination, the capture valve comprising a housing physically contacting a lid and containing a floating member, the lid having an inlet and an outlet, the inlet having a greater length and smaller diameter than the outlet, the outlet positioned at an apex of a conical sealing surface of the lid;

flowing a gas sample through the inlet to the outlet unimpeded by the floating member;

introducing liquid into the housing through the inlet in order to fill the housing with a predetermined volume; and sealing the outlet with the floating member in response to the predetermined volume of liquid.

16. The method of claim 15, wherein a pressure source provides positive pressure to the inlet.

17. The method of claim 15, wherein a pressure source provides vacuum pressure to the outlet.

18. The method of claim 15, wherein the housing has a squirt valve activated by a predetermined pressure within the housing to release liquid outside of the housing.

19. The method of claim 15, wherein the lid comprises a liquid port that allows liquid to flow outside the housing in response to a predetermined pressure inside the housing.

20. The method of claim 15, wherein the inlet remains open while the floating member contacts an outlet edge of the lid to seal the outlet.

\* \* \* \* \*